United States Patent [19]

Hehl

[11] 3,988,099

[45] Oct. 26, 1976

[54] MACHINE BASE WITH HYDRAULIC CONTROLS FOR INJECTION MOLDING MACHINE

[76] Inventor: Karl Hehl, Arthur-Hehl-Strasse 32, 7291 Lossburg, Germany

[22] Filed: May 28, 1974

[21] Appl. No.: 473,690

[30] Foreign Application Priority Data
July 23, 1973 Germany.............................. 2337276

[52] U.S. Cl........................... 425/242 R; 425/450.1
[51] Int. Cl.².......................................... B29F 1/00
[58] Field of Search................. 425/242, 450.1, 192; 100/214

[56] References Cited
UNITED STATES PATENTS

| | | |
|---|---|---|
| 2,580,078 | 12/1951 | Denison, Jr..................... 100/214 X |
| 3,479,698 | 11/1969 | Shaughnessy.................... 425/242 X |
| 3,574,896 | 4/1971 | Fernholz.......................... 425/242 X |
| 3,914,082 | 10/1975 | Hehl .................................. 425/192 |

Primary Examiner—Francis S. Husar
Assistant Examiner—David S. Safran
Attorney, Agent, or Firm—Joseph A. Geiger

[57] ABSTRACT

A machine base for injection molding machines with a hydraulic controls arrangement in which the various hydraulic distributor units and solenoid valves are combined in a compact block assembly and mounted on the outside of the rear longitudinal wall of the base, the associated control knobs being located on the front longitudinal wall and connected to the throttle valves of the distributors by means of universally-jointed shafts.

13 Claims, 3 Drawing Figures

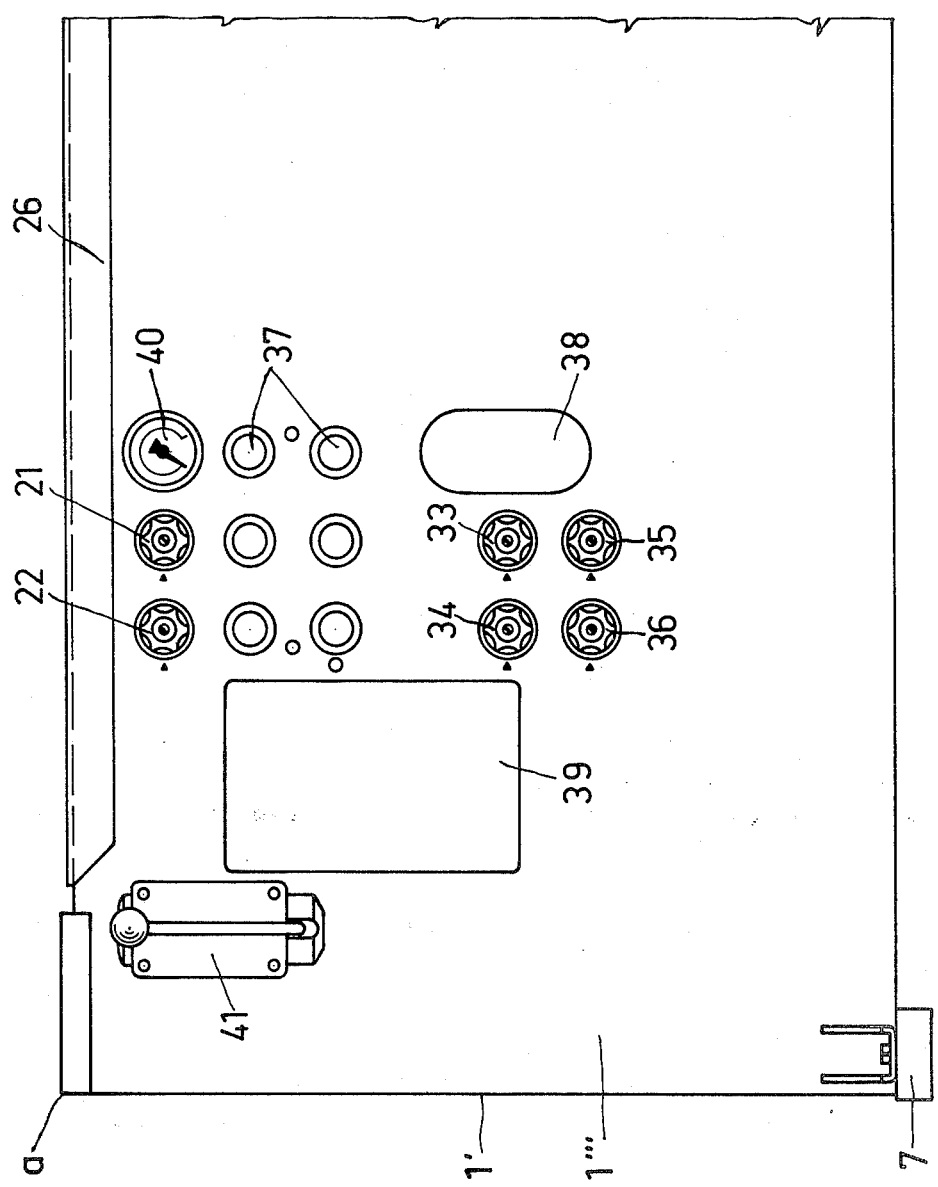

MACHINE BASE WITH HYDRAULIC CONTROLS FOR INJECTION MOLDING MACHINE

BACKGROUND OF THE INVENTION

1. Field of the Invention

The present invention relates to hydraulic controls for injection molding machines, and in particular to arrangements of hydraulic controls and hydraulic components on the base of an injection molding machine.

2. Description of the Prior Art

Injection molding machines require a number of hydraulic control components for the operation of the die closing unit, injection unit or units, parts ejection device, core removing unit, etc. These hydraulic controls are normally arranged in accordance with design expedience or availability of mounting space. In a known machine base of this type, as disclosed in my U.S. Pat. No. 3,914,082, a number of hydraulic distributors are combined in a compact distributor block which is mounted in a horizontal position inside the forward compartment of the machine base, at a level situated below the level of hydraulic fluid in the adjacent hydraulic fuel reservoir. The solenoid valves associated with the distributor block are attached to the underside of the distributors in a compact row. The oil filter for the hydraulic system, arranged in the return line, is likewise arranged below the fluid level of the reservoir.

In other prior art solutions, the various distributors are not combined in a single distributor block, but two or more groups of distributors are arranged at different locations on the machine base, in accordance with the position of the various machine components.

Among the shortcomings inherent to these prior art solutions are their lack of easy accessibility, poor cooling of the components, inadequate visibility of the components for visual inspection and monitoring, and frequently, poor placement of the adjustment knobs for the hydraulic controls. Lastly, the arrangement of a distributor system in several groups, or as a single block inside the machine base, is costly in terms of manufacture as well as in terms of servicing and replacement of components. For example, in the case of the distributor block situated below the fluid level, the latter has to be lowered, before the hydraulic controls components can be removed for inspection or replacement.

SUMMARY OF THE INVENTION

It is a primary objective of the present invention to eliminate at least some of the above-mentioned shortcomings by suggesting an improved arrangement of the hydraulic controls on an injection molding machine base.

The present invention proposes to attain the above objective by suggesting a machine base for an injection molding machine in which the distributors and associated solenoid valves are combined in a single distributor block assembly which is mounted on the outside of the rear longitudinal wall of a block-shaped machine base, with the main distributors for the die closing unit and injection unit, or units, positioned above the fluid level in the hydraulic fluid reservoir and the remaining distributors arranged in a compact row underneath them. It further suggests that the adjustment knobs for these control components be arranged on the outside of the front longitudinal wall of the machine base, where they are conveniently accessible to the machine operator.

The invention further suggests that the interior space of the block-shaped machine base be subdivided by a transverse wall into a rear compartment, serving as a hydraulic fluid reservoir, and a forward compartment situated underneath the die closing unit and accomodating the cooler for the hydraulic fluid. The distributor block assembly is thus mounted on the backside of this cooler compartment, while the control knobs are supported in the front longitudinal wall of the compartment, being connected to the various distributors by means of long control shafts reaching through the cooler compartment. These control shafts are preferably of the universal-joint type, thereby permitting spacing and location of the control knobs on the front longitudinal wall in an esthetically pleasing and convenient arrangement.

Besides being compact and easily accessible, this hydraulic controls arrangement has the further advantage that it is most suitable for adaption to different hydraulic controls requirements of various types of injection molding machines. For this purpose, the number of distributors in the distributor block assembly can be conveniently increased or decreased, in accordance with the building block system. Furthermore, because the hydraulic controls are arranged at the outside of the machine base, their cooling is improved, which in turn increases the longevity of the components. Still further advantages are realized with respect to the manufacture and assembly of these components, and especially with respect to inspection and servicing accessibility. Lastly, the suggested arrangement of the distributor block assembly means that the plungers of the distributor valves move horizontally and are not affected by gravity.

The distributor block assembly is preferably attached to the rear longitudinal wall of the machine base by means of an intermediate mounting bracket arranged between the upper distributors and the machine base wall. These upper distributors control the hydraulics of the die closing unit and of the injection unit, or units, and are therefore standard equipment for all injection molding machines. The remaining distributors and associated solenoids are simply mounted to the underside of these upper distributors.

The filter for the hydraulic fluid is preferably likewise mounted on the outside of the machine base, adjacent to the distributor block assembly, so as to be easily accessible for servicing.

BRIEF DESCRIPTION OF THE DRAWINGS

Further special features and advantages of the invention will become apparent from the description following below, when taken together with the accompanying drawings which illustrate, by way of example, an embodiment of the invention, represented in the various figures as follows:

FIG. 3 is a likewise enlarged partially cut front view of the machine base of FIG. 1.

DESCRIPTION OF THE PREFERRED EMBODIMENT

Figure 1:
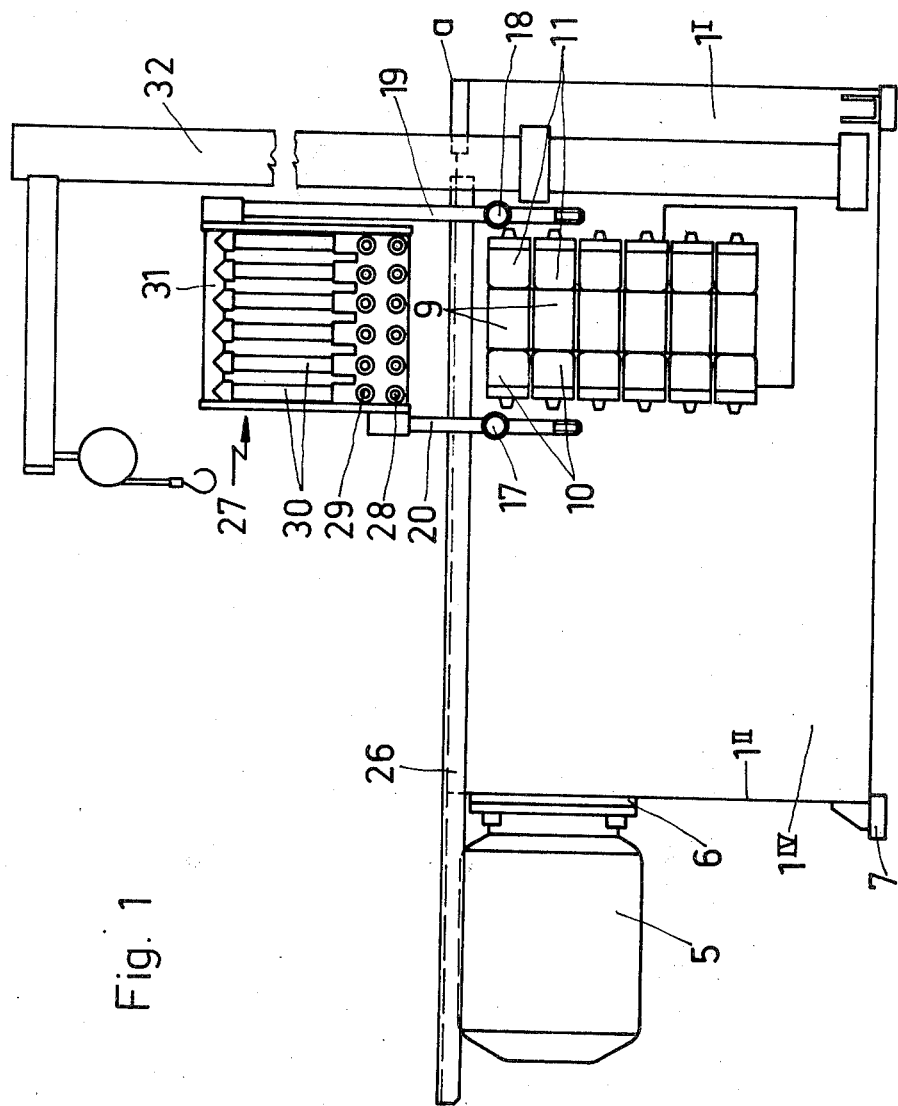
FIG. 1 shows a machine base for an injection molding machine, as seen from behind, with a hydraulic controls arrangement, as an embodiment of the invention.
Figure 2:
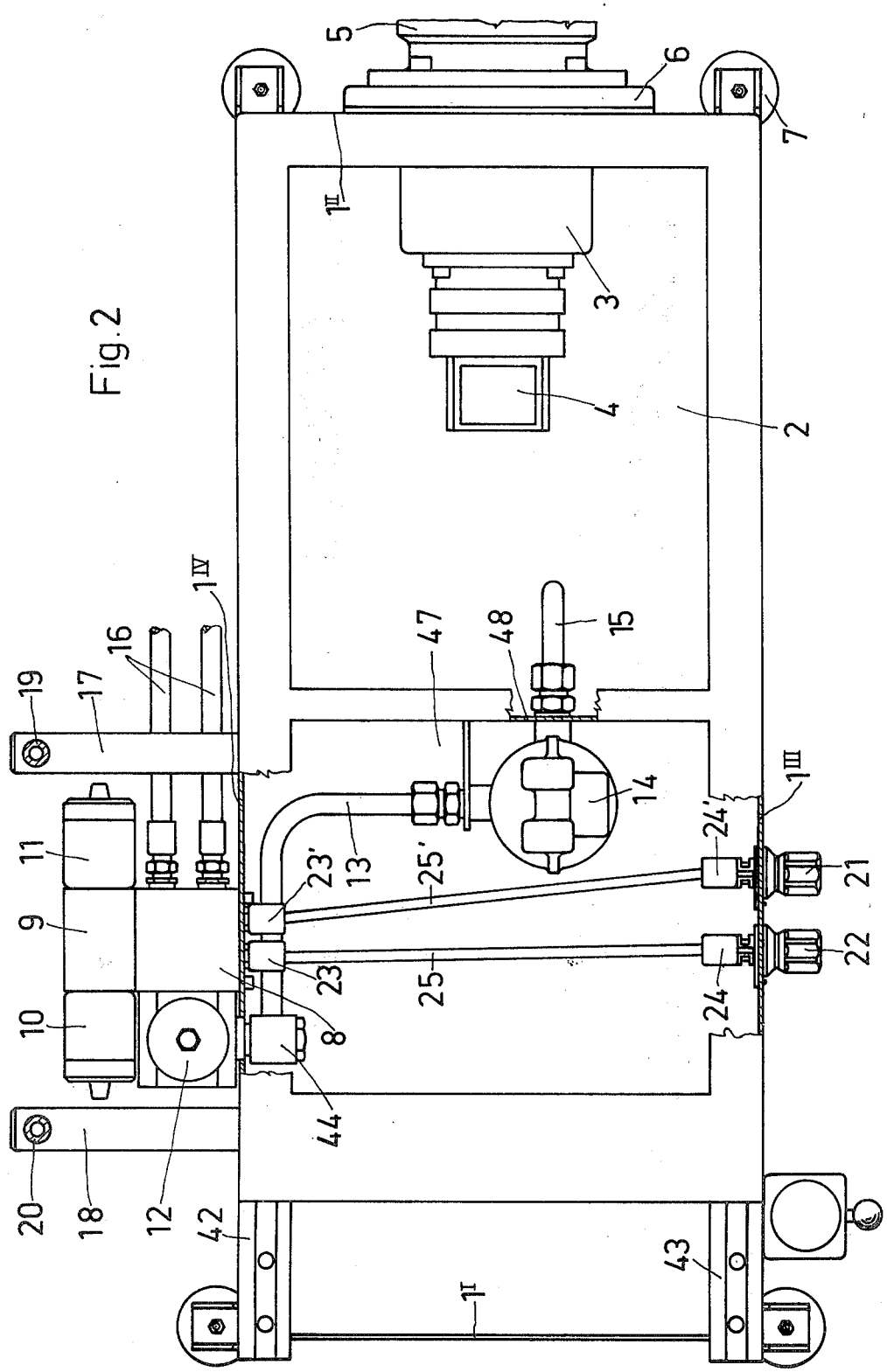
FIG. 2 shows the machine base of FIG. 1 in an enlarged-scale plan view.

In FIGS. 1–3 is illustrated a block-shaped base for an injection molding machine constructed of welded steel sheet. The inside of this rectangular structure is subdivided by a transverse wall 48 so as to create a hydraulic fluid reservoir 2 between the transverse wall 48 and the right-hand side wall 1″ of the machine base, and a cooler compartment 47 between the transverse wall 48 and the left hand side wall 1′. Inside the — partially open — cooler compartment 47 is arranged a cooler 14 for the hydraulic fluid. The right-hand side wall 1″ carries a hydraulic power unit consisting of an electric motor 5, mounted on the back side of wall 1″ by means of a flange 6, and a hydraulic pump 4 projecting into the fluid reservoir 2 from a flanged socket 3 clamped against the inside of wall 1″. The machine base itself is supported on its four corners by elastic supports 7.

This machine base is designed to carry a die closing unit (not shown), including a stationary die plate and a movable die plate, the stationary die plate being part of a stationary cylinder mount, for example. This die closing unit, including one or several injection units, is supported on the machine base at the mounting faces 42 and 43 (FIG. 2). The mounting face for the injection molding die on the stationary die plate would preferably be positioned in alignment with the left-hand side wall 1′ of the machine base. The cooler unit 14 is mounted against the transverse wall 48, a fluid return outlet 15 leading from cooler 14 across the wall 48 into the reservoir 2.

On the rear longitudinal wall $1^{IV}$ is mounted a distributor block assembly 8, 9, 10, and 11. This assembly consists essentially of a vertically arranged series of distributors 8, each carrying a control valve 9 with solenoids 10 and 11. For this purpose, the distributors 8 have an outer mounting face extending parallel to the rear longitudinal wall $1^{IV}$ on which the control valve 9 is mounted. The valves 9 carry solenoids 9 and 10 on their longitudinal extremities, meaning that the valve plungers are oriented horizontally and are therefore not influenced by gravity. Only the upper distributors 8 which control the die closing unit and the injection unit, or units, are directly mounted against the base wall $1^{IV}$, using an intermediate mounting bracket, since the die closing and injection units can be considered standard components for all injection molding machines. The remaining distributors 8 are attached to the underside of the upper distributors, being carried by the latter. These additional distributors may control such machine components as the parts ejector device, core removing unit, and others.

The inlet and outlet lines 16 for the distributors 8 of the die closing unit and injection unit are arranged on the right-hand side of the distributor 8, (FIG. 2) while the corresponding lines for lower distributors 8 run in the opposite direction, and the lines of still further distributors may run through the wall $1^{IV}$ to the inside of the machine base.

The upper distributors 8 are arranged just below the top surface of the machine base, defined by a top frame 26, meaning that they are located above the fluid level of the hydraulic fluid reservoir 2. On each side of the distributor block assembly, at about the level of the uppermost distributor 8, are further arranged horizontal cantilever arms 17 and 18 carrying the legs 19 and 20 of a vertically adjustable cooling controls assembly 27. These cooling controls include a series of vertical columns 30 and flow adjustment controls 28 and 29.

The distributor block assembly and the cooling controls assembly are thus positioned on the rear side, i.e. the side opposite the normal position of the machine operator. While the columns 30 of the cooling controls assembly are visible across the machine, adjustment access to the distributors 8 by the operator is accomplished by extending the adjustment controls horizontally across the cooler compartment 47 of the machine base to the outside of the front longitudinal wall 1‴. Each distributor 8 has two throttle members, one for each flow direction of the hydraulic fluid, thereby permitting independent adjustment of the speed of the advancing and retracting motions of the various machine components. To each throttle member is connected a rotatable control shaft 25 extending across the free space of the cooler compartment 47, the shaft being supported in a bearing mounted in the front longitudinal wall 1‴ of the base and carrying a knob 21, 22, etc. on its protruding end. Depending on the horizontal and vertical spacing of the various throttle members in the distributor block assembly, some or all of the control shafts 25 may be provided with universal joints 23 and 24, in order to obtain a more suitable spacing of the control knobs on the front side of the machine base. For example, the illustrated embodiment, in FIG. 2, shows that the left-hand throttle members and their associated control knobs 22 are arranged substantially in coaxial alignment, while each right-hand throttle member, being closely spaced to the left-hand throttle member, requires universal joints 23′ and 24′, in order to permit adequate spacing of control knob 21 from control knob 22.

It should be understood that the control shafts with universal joints extending across the cooler compartment 47 could be replaced with flexible shafts or other rotation-transmitting means which permit an offset positioning of the control knobs in relation to the rotational axis of the throttle members.

In FIG. 3 is shown a typical arrangement of a set of control knobs on the front side of the machine. Knobs 21 and 22 of the top row, for example, control the opening and closing speeds of the die closing unit, the gauge 40 indicating the closing pressure. The second and third levels 37 are shown without knobs and gauges; they would be used for one or two injection units. Additional control knobs 33, 34, etc. are arranged further below. The openings 38 and 39 in the front longitudinal wall 1‴ serve for the circulation of cooling air through the cooler compartment 47 and for access to the control shafts 25 and 25′.

A fluid filter 12 is arranged on the outside of the rear longitudinal wall $1^{IV}$ (FIG. 2), in the space between the uppermost distributor 8, the solenoid 10, and the cantilever arm 18. The filter 12 is arranged vertically, just below the top level of the machine base. In its upper portion the filter has a magnetic particle separator, and in its lower portion it includes a cylindrical screen filter unit.

A pressure feed line (not shown) leads from the hydraulic pump 4 to the top end of the distributor block assembly, and a return line leads from the bottom end of the distributor block assembly to the filter 12 and from there, via a connector 44 and a line 13, to the cooler 14, and through a return outlet 15 into the hydraulic fluid reservoir 2. These connections to the distributor block assembly facilitate servicing of the distributor block components, because they eliminate the need for emptying the fluid reservoir 2, in order to prevent discharge of fluid through the open distributor block assembly 8, 9, 10, and 11.

It should be further understood that the foregoing disclosure describes only a preferred embodiment of the invention and that it is intended to cover all changes and modifications of this example of the invention which fall within the scope of the appended claims.

I claim:

1. In an injection molding machine which has a generally rectangular block-shaped hollow machine base with front and rear longitudinal walls, opposing side walls, and a top mounting surface for supporting thereon a die closing unit, and which has hydraulic control means for operating various, including said die closing unit which opens and closes an injection molding die and one or several injection units, as well as a parts ejector, wherein the improvement comprises, as part of said hydraulic control means, a hydraulic controls arrangement including:
   a plurality of hydraulic distributor units with rotatable throttle members, said units being mounted in a vertical succession on the outside of the rear longitudinal wall of the machine base;
   a corresponding number of control knobs for said throttle members arranged on the outside of the front longitudinal wall, the control knobs being journalled in said wall; and
   means for rotationally linking each control knob to a throttle member across the space between the two longitudinal walls.

2. A hydraulic controls arrangement as defined in claim 1, wherein
   the hollow machine base further includes a transverse partition wall extending between the front and rear longitudinal walls so as to divide the space inside the machine base into two compartments of which one is a hydraulic fluid reservoir and is located rearwardly with respect to said die closing unit, being bounded by the partition wall, one side wall, and length portions of the front and rear longitudinal walls, and the other compartment is laterally open and located forwardly of the partition wall between the remaining length portions of the front and rear longitudinal walls;
   the distributor units and their associated control knobs are arranged on the longitudinal wall portions which bound said open forward compartment; and
   said rotational linking means extend across the open forward compartment.

3. A hydraulic controls arrangement as defined in claim 1, wherein:
   at least some of the control knobs are axially offset in relation to the axes of the associated throttle members of the hydraulic distributor units; and
   the rotational linking means between the offset control knobs and throttle members are control shafts, each shaft including at least one universal joint.

4. A hydraulic controls arrangement as defined in claim 3, wherein:
   each distributor unit has two horizontally spaced rotatable throttle members for controlling opposite fluid flows to a machine component;
   the control knobs are arranged in two vertical columns on the front longitudinal wall of the machine base at a horizontal spacing between the columns which is greater than that of the throttle members; and
   the rotational axes of the control knobs in one column are aligned with the rotational axes of the associated throttle members, while the knob axes in the other column are horizontally offset with respect to the associated throttle member axes.

5. A hydraulic controls arrangement as defined in claim 1, wherein:
   the hydraulic distributor units are vertically attached to each other so as to form distributor cluster; and
   one or two of the uppermost units of this distributor cluster are horizontally mounted to an intermediate mounting bracket on the rear longitudinal wall of the machine base.

6. A hydraulic controls arrangement as defined in claim 5, wherein:
   the machine base further includes a pair of cantilever arms extending horizontally at right angles from its rear longitudinal wall at either side of the distributor cluster; and
   the cantilever arms support a vertically adjustable cooling controls assembly positioned above the machine base so as to be visible from the front side of the machine by a machine operator.

7. A hydraulic controls arrangement as defined in claim 1, wherein:
   each distributor unit has a generally rectangular main body with an outer face which is substantially parallel to the rear longitudinal wall of the machine base; and
   each distributor unit further includes a solenoid-operated control valve with horizontally opposing solenoids attached to the mounting faces of its main body, the control valve having a horizontally moving valve plunger.

8. A hydraulic controls arrangement as defined in claim 7, wherein:
   the distributor units have inlet and outlet lines connected to their main bodies, the lines of at least some of the units extending parallel to the rear longitudinal wall in the space between said wall and a plane which coincides with the mounting faces of said main bodies.

9. A hydraulic controls arrangement as defined in claim 1, wherein:
   the hydraulic operating means of the machine includes a hydraulic pump and a fluid supply line leading from the pump to the distributor units; and
   the inlet connection of the supply line leads to the uppermost distributor unit, at a level above the fluid level inside the hydraulic fluid reservoir.

10. A hydraulic controls arrangement as defined in claim 9, wherein:
    the hydraulic pump is part of a rigid power unit, which unit further includes a coaxially connected electric motor located outside the rear side wall of the machine base and means for mounting it in said wall so as to position the pump inside the hydraulic fluid reservoir, below the top of the machine base and above said fluid level; and
    the distributor units are likewise positioned below the top of the machine base.

11. A hydraulic controls arrangement as defined in claim 9,
    further including a fluid return line leading from the distributor units to the hydraulic fluid reservoir, with a fluid filter and a fluid cooler in said return line; and the connection for the return line is at the lowermost distributor unit.

12. A hydraulic controls arrangement as defined in claim 11, wherein:

the fluid filter is arranged outside the rear longitudinal wall of the machine base, adjacent the hydraulic distributor units; and said filter is arranged vertically, having a magnetic separator in its upper portion and a filtering screen in its lower portion.

13. A hydraulic controls arrangement as defined in claim 11, wherein:

the fluid cooler is arranged in the return line, between the filter and the fluid reservoir and is mounted inside the forward compartment of the machine base at the transverse partition wall.

* * * * *